(12) United States Patent
Noyan et al.

(10) Patent No.: US 7,636,433 B2
(45) Date of Patent: Dec. 22, 2009

(54) TIMELINE VISUALIZATION FOR CALL CENTER PROCESSES

(75) Inventors: Nilay Noyan, Highland Park, NJ (US);
Henry R. Paddock, Boulder, CO (US);
Patrick H. Tendick, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 937 days.

(21) Appl. No.: 11/293,722

(22) Filed: Dec. 2, 2005

(65) Prior Publication Data
US 2007/0127695 A1 Jun. 7, 2007

(51) Int. Cl.
*H04M 3/00* (2006.01)
(52) U.S. Cl. ............................. 379/265.03; 379/266.1
(58) Field of Classification Search ............. 379/266.1, 379/265.03
See application file for complete search history.

(56) References Cited

U.S. PATENT DOCUMENTS

| | | | |
|---|---|---|---|
| 5,206,903 A | 4/1993 | Kohler et al. | |
| 5,905,793 A | 5/1999 | Flockhart et al. | |
| 6,192,122 B1 | 2/2001 | Flockhart et al. | |
| 6,353,667 B1 | 3/2002 | Foster et al. | |
| 6,356,632 B1 | 3/2002 | Foster et al. | |
| 6,366,666 B2 | 4/2002 | Bengtson et al. | |
| 6,535,601 B1 | 3/2003 | Flockhart et al. | |
| 6,563,920 B1 | 5/2003 | Flockhart et al. | |
| 6,614,903 B1 | 9/2003 | Flockhart et al. | |
| 6,633,640 B1 | 10/2003 | Cohen et al. | |
| 6,661,889 B1 | 12/2003 | Flockhart et al. | |
| 6,732,188 B1 | 5/2004 | Flockhart et al. | |
| 6,760,428 B2 | 7/2004 | Foster | |
| 6,925,165 B2 | 8/2005 | Cohen et al. | |
| 2002/0082865 A1* | 6/2002 | Bianco et al. | 705/2 |

* cited by examiner

*Primary Examiner*—Creighton Smith
(74) *Attorney, Agent, or Firm*—Chapin IP Law, LLC; David W. Rouille, Esq.

(57) ABSTRACT

A reporting system is utilized to generate timeline visualization information characterizing a process in a call center. The reporting system comprises a report server, a graphical server, and a database. The report server receives a request for a report, relating to one or more specified aspects of the call center process, from a user terminal, and generates a query to the database. The report server utilizes information retrieved from the database responsive to the query to generate a report for delivery to the user terminal. The report comprises at least one timeline having a plurality of image identifiers associated therewith. The graphical server supplies image files corresponding to respective ones of the image identifiers to the user terminal to thereby permit generation of a visualization of the timeline at the user terminal.

20 Claims, 4 Drawing Sheets

| CALL_ID | START | END | AGENT ID | STATE/EVENT | OTHER DATA |
|---|---|---|---|---|---|
| 111 | 11:10:15 | | | QUEUED | .... |
| 111 | 11:10:15 | 11:10:16 | | IN QUEUE | .... |
| 111 | 11:10:16 | | 1001009 | OFFERED TO AGENT | |
| 111 | 11:10:16 | 11:10:21 | 1001009 | ALERTING | .... |
| 111 | 11:10:21 | | 1001009 | ACCEPTED | .... |
| 111 | 11:10:21 | 11:10:28 | 1001009 | ACTIVE | .... |
| 111 | 11:10:28 | | 1001009 | CONTACT HELD | .... |
| 111 | 11:10:28 | 11:10:33 | 1001009 | ON HOLD | .... |
| 111 | 11:10:33 | 11:10:38 | 1001009 | ACTIVE | .... |
| 111 | 11:10:38 | | 1001009 | AGENT DISCONNECTED | .... |
| 111 | 11:10:38 | 11:10:45 | 1001009 | WRAP-UP | .... |
| 111 | 11:10:45 | | 1001009 | COMPLETED | .... |
| 211 | 11:10:27 | | | ARRIVED TO THE SYSTEM | .... |
| 211 | 11:10:33 | | | OFFERED TO AGENT | |
| 211 | 11:10:33 | 11:10:40 | 1001009 | ALERTING | .... |
| 211 | 11:10:40 | | 1001009 | ACCEPTED | .... |
| 211 | 11:10:40 | 11:15:57 | 1001009 | ACTIVE | .... |
| 211 | 11:15:57 | | 1001009 | DISCONNECTED | .... |

*FIG. 5A*

| EVENT | SYMBOL |
|---|---|
| QUEUED | ◇ |
| OFFERED TO AGENT | ? |
| COMPLETED | ✓ |
| ACCEPTED | 👆 |
| CONTACT HELD | 📌 |
| DISCONNECTED | ✗ |
| AGENT DISCONNECTED | ✗ |

*FIG. 5B*

| STATE | LINE STYLE |
|---|---|
| IN QUEUE | —— |
| ALERTING | - - - - |
| ACTIVE | —— |
| ON HOLD | - - - - |
| WRAP-UP | |

*FIG. 6*

| CALL ID | START TIME | END TIME | ROUTING | TIMELINE VISUALIZATION |
|---|---|---|---|---|
| 111 | 11:10:15 | 11:10:45 | AGENT POOL | ◇?--👆—📌----✗  ✓ |
| 211 | 11:10:32 | 11:15:57 | SPECIFIC AGENT | ?--👆——————— |

TIMELINE VISUALIZATION FOR CALL CENTER PROCESSES

FIELD OF THE INVENTION

The invention relates generally to call centers in which voice calls, e-mails, faxes, voice messages, text messages, Internet service requests or other types of communications are distributed among a number of service agents for handling.

BACKGROUND OF THE INVENTION

Call centers, also commonly referred to as contact centers, distribute calls and other types of communications to available service agents in accordance with various criteria. A problem that arises in such call centers involves the presentation of complex, detailed historical data related to call center processes. Call center managers need to understand the activities and states of many different entities, including agents, calls, queues, trunks, and the like, from many perspectives. For example, a call center manager might want to understand why calls are being placed on hold for long periods of time, how agents are spending their time, what agent behavior led to a particular customer complaint, etc.

A typical conventional approach is to present detailed information in the form of lengthy, plain tabular detail reports. By detailed information, we mean information about specific events, such as calls, transactions, etc. This is in contrast to summary information like counts of calls handled by agents. A call center manager can be overwhelmed with the number of items returned by current detail reports. For example, a given detail report may be in the form of a tabular listing of every call processing action taken for every call handled by a particular agent. The detailed information may be extracted by a call center reporting system, loaded into a database, and then used to generate a tabular detail report. However, understanding the information in such a tabular detail report can be unduly time-consuming and may not help the manager recognize inappropriate agent behavior and other problems.

It is therefore apparent that a need exists for improved techniques for presenting call center process information, so as to overcome the drawbacks associated with the above-described tabular detail reports. More specifically, what is needed is a concise and intuitive visual presentation of call center process information through new graphical visualization techniques that are compatible with and delivered through a reporting platform.

SUMMARY OF THE INVENTION

The invention provides methods and apparatus which improve the management and presentation of call center process information. More particularly, the invention in an illustrative embodiment provides techniques for graphical visualization of call center process information so as to facilitate understanding of call center operation.

In accordance with one aspect of the invention, a reporting system is utilized to generate timeline visualization information characterizing a process in a call center. The reporting system comprises a report server, a graphical server, and a database. The report server and graphical server in the illustrative embodiment comprise a reporting platform and a graphical servlet, respectively, and may be implemented on a single common processing device or on different processing devices in a set of such devices. The report server receives a request for a report, relating to one or more specified aspects of the call center process, from a user terminal, and generates a query to the database. The report server utilizes information retrieved from the database responsive to the query to generate a report for delivery to the user terminal. The report comprises at least one timeline having a plurality of image identifiers associated therewith. The graphical server supplies image files corresponding to respective ones of the image identifiers to the user terminal to thereby permit generation of a visualization of the timeline at the user terminal.

In the illustrative embodiment, the timeline may comprise, by way of example, distinct symbols representative of respective events of the call center process and distinct line styles representative of respective states of the call center process. As a more particular example, in an arrangement in which the call center process to be reported on comprises the handling of one or more calls by a particular agent of the call center, the timeline events represented by the distinct symbols may comprise one or more of a queued event, an offered to agent event, a completed event, an accepted event, a contact held event, a call disconnected event, and an agent disconnected event. Similarly, the timeline states, represented by the distinct line styles, may comprise one or more of an in queue state, an alerting state, an active state, an on-hold state and a wrap-up state. Numerous alternative call center processes, events, or states, and associated symbols, line styles or other types of images, may be used to provide timeline visualization in accordance with the techniques of the invention.

The present invention in its illustrative embodiments provides a number of significant advantages over conventional techniques. For example, the described techniques advantageously provide concise and intuitive graphical representations of event and state details for calls and other call center processes, in the form of timeline visualizations, and can be configured to deliver the timelines through otherwise conventional reporting tools. Conventional tabular detail reports are replaced with improved reports that present call center process information in a much more compact and understandable form, thereby making it much easier for a call center manager or other user to monitor agents and other call center entities.

These and other features and advantages of the present invention will become more apparent from the accompanying drawings and the following detailed description.

BRIEF DESCRIPTION OF THE DRAWINGS

FIGS. 5A and 5B are tables listing respective event and state elements and corresponding visual representations thereof utilized in a call center timeline visualization technique in an illustrative embodiment of the invention.

FIG. 6 shows an example of a graphical display that may be generated in the FIG. 1 system utilizing the visual representations of FIGS. 5A and 5B.

DETAILED DESCRIPTION OF THE INVENTION

Although the invention will be illustrated below in conjunction with the processing of calls in an exemplary call center, it is not limited to use with any particular type of call center or communication processing application. For example, the invention is applicable to the processing of incoming communications, outgoing communications or both. The disclosed techniques can be used with automatic call distribution (ACD) systems, telemarketing systems, private-branch exchange (PBX) systems, computer-telephony integration (CTI)-based systems, as well as in combinations of these and other types of call centers. A call center in accordance with the invention may be configured using any type of network infrastructure, such as, e.g., asynchronous transfer mode (ATM), local area networks, wide area networks, Internet Protocol (IP) networks, etc.

The term "call center" as used herein is thus intended to include any type of contact center, ACD system, telemarketing system or other communication system which processes calls or other service requests, including voice calls, video calls, multimedia calls, e-mail, faxes, text chat or voice messages as well as various portions or combinations of these and other types of communications.

The term "call" as used herein is intended to include any of the above-noted types of communications as well as portions or combinations of these and other communications.

Figure 1:
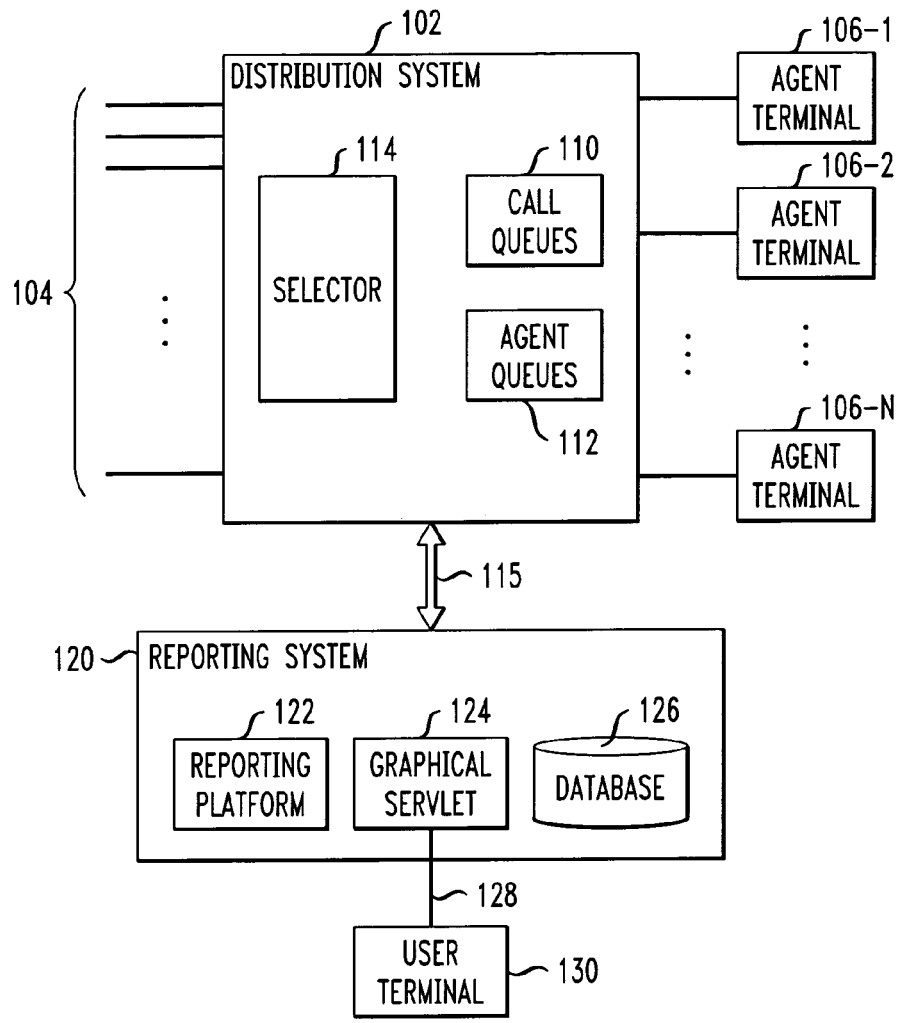
FIG. 1 is a block diagram of a call center system in which the present invention is implemented in an illustrative embodiment.

FIG. 1 shows an illustrative call center 100 in which the present invention is implemented. The call center 100 comprises a distribution system 102 which is coupled between trunks or other communication lines 104 and agent terminals 106. The system may include an arbitrary number N of agent terminals, denoted 106-1, 106-2, ... 106-N in the figure. Calls or other communications are stored in call queues 110 until ready to be assigned to available agents. Available agents may be enqueued in agent queues 112. The queues 110, 112 may each be divided into a plurality of separate queues based on skills required to process a given communication, as is well known. A selector 114 is operative to assign calls or other communications enqueued in call queues 110 to available agents enqueued in agent queues 112.

The distribution system 102 may be, for example, a PBX-based ACD system, or other type of ACD system. It should be understood, however, that the present invention does not require the use of an ACD system or any other particular call processing hardware, software or firmware configuration in distribution system 102.

Additional details regarding conventional aspects of call processing in a system such as distribution system 102 can be found in, for example, U.S. Pat. No. 5,206,903, issued Apr. 27, 1993 in the name of inventors J. E. Kohler et al. and entitled "Automatic Call Distribution Based on Matching Required Skills with Agents Skills," U.S. Pat. No. 5,905,793, issued May 18, 1999 in the name of inventors A. D. Flockhart et al. and entitled "Waiting-Call Selection Based on Anticipated Wait Times," U.S. Pat. No. 6,192,122, issued Feb. 20, 2001 in the name of inventors A. D. Flockhart et al. and entitled "Call Center Agent Selection that Optimizes Call Wait Times," and U.S. Pat. No. 6,614,903, issued Sep. 2, 2003 in the name of inventors A. D. Flockhart et al. and entitled "Methods and Apparatus for Service State-Based Processing of Communications in a Call Center," all of which are commonly assigned herewith and incorporated by reference herein.

The distribution system 102 in call center system 100 of FIG. 1 is coupled via connection 115 to a reporting system 120. The connection 115 may comprise a conventional network connection, for example, a connection established over a local, metropolitan or wide area network, or a connection established using combinations of these and other networks. The reporting system 120 may thus be co-located with the distribution system 102, or located remotely from the distribution system 102. The reporting system 120 as shown comprises a reporting platform 122, a graphical servlet 124, and a reporting database 126. These elements of reporting system 120 may be implemented on a single server or other set of processing devices of system 100, or each such element may be implemented on separate arrangements of one or more processing devices. For example, the database 126 may comprise a third-party database, such as a server equipped with conventional Oracle, IBM DB2 or Microsoft Structured Query Language (SQL) database software. Coupled to the reporting system 120 via a connection 128 is a user terminal 130. The connection 128, like the connection 115, need not take any particular form, and may be a network connection, a wireless connection, a cable, etc.

The reporting platform 122 and graphical servlet 124 are examples of elements that are more generally referred to herein as a report server and a graphical server, respectively.

The term "servlet" as used herein should be understood to refer generally to one or more code modules that run in a server application to answer client requests. The code modules may comprise Java code modules, or modules based on other programming languages. The invention does not require the use of servlets. Thus, a given graphical server in an embodiment of the invention can be implemented without the use of a servlet.

The reporting system 120 generally provides a call center manager, supervisor, administrator or other user at terminal 130 with access to information regarding performance of the agents in processing calls or other communications. In the illustrative embodiment, that information may comprise timeline visualizations, generated using one or more image files, which greatly facilitate an understanding of call center operation. Additional details regarding interaction between the elements 122, 124 and 126 of the reporting system 120 and the user terminal 130 will be described below with reference to FIG. 7.

It should be noted that the call center system 100 of FIG. 1 may include additional elements not explicitly shown in the figure, such as routers, gateways or other network elements. The system may also or alternatively include one or more communication system switches, such as a DEFINITY® Enterprise Communication Service (ECS) communication system switch available from Avaya Inc. of Basking Ridge, N.J., USA. Another example call processing switch suitable for use in conjunction with the present invention is the MultiVantage™ communication system switch, also available from Avaya Inc. Various elements of the FIG. 1 system may be implemented using known elements of these and other conventional switches, or portions or combinations of such switch elements.

Thus, it is to be appreciated that the invention can be implemented in systems using a wide variety of other types and arrangements of distribution systems, agent terminals, queues, selectors, reporting systems, user terminals and other elements. The particular number and arrangement of such elements of the FIG. 1 system are merely exemplary, and may vary depending upon the needs of a given implementation.

Figure 2:
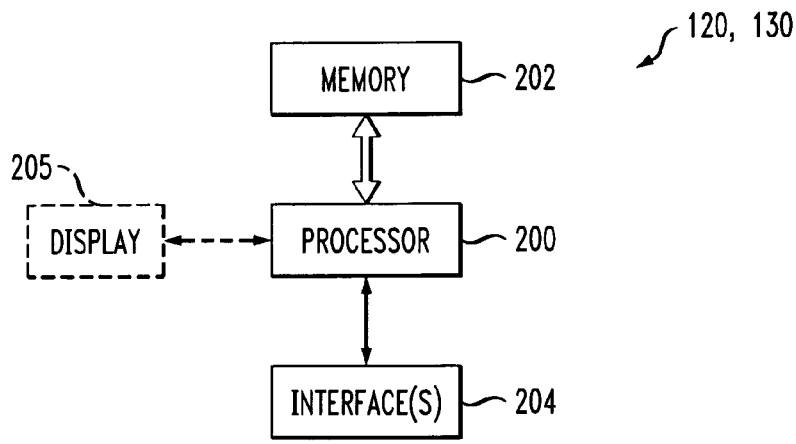
FIG. 2 is a simplified block diagram of a processing device of the FIG. 1 system.

FIG. 2 shows a simplified block diagram of one possible implementation of a processing device of the call center system 100 of FIG. 1. The processing device of FIG. 2 comprises a processor 200 coupled to a memory 202 and to one or more interfaces 204. The processing device may be viewed as representing a single server or multiple servers or other computers that comprise one or more elements of the reporting system 120. As another example, the processing device of FIG. 2 may be viewed as representing a workstation, a laptop or desktop personal computer, a personal digital assistant or other device comprising user terminal 130. In this case, the processing device may further comprise an output device such as display 205, for presenting timeline visualizations and other call center performance information in graphical form in accordance with the techniques described herein. The processor 200 may comprise a computer, central processing unit, or microprocessor, or portions or combinations of such elements. The memory 202 may comprise electronic memory, such as random access memory (RAM) or read-only memory (ROM), magnetic memory, optical memory, etc. in any combination. The illustrative embodiments may be implemented at least in part in the form of one or more software programs which run on processing devices configured as shown in FIG. 2. Those skilled in the art can readily program such devices to implement the various techniques described herein.

In accordance with an aspect of the present invention, the call center of FIG. 1 is configured to include capabilities for presenting performance information using timeline visualizations. This aspect of the present invention will be described in greater detail below, with reference to the diagrams of FIGS. 3 through 7.

Figures 3, 4:
FIG. 3 is a tabular listing of a call trace report for a given agent of the FIG. 1 system.
FIG. 4 shows an example of a call timeline.

FIG. 3 shows a type of tabular detail report that may be generated in the FIG. 1 system using reporting system 122. This particular detail report, also referred to as a call trace report, shows the details associated with the processing of two calls, having call identifiers 111 and 211, by a given agent of the system 100. The trace report as shown includes columns for call identifier, start time, end time, agent identifier, state or event, and other data, and may be presented, by way of example, on a screen of display 205 in user terminal 130. This type of report may be generated using an otherwise conventional third-party reporting platform 122, such as the Cognos ReportNet™ reporting platform from Cognos Incorporated of Ottawa, Canada. The particular format of the report may be configured in a straightforward manner using a report authoring tool, such as the Cognos ReportStudio™ tool. Other examples of known reporting platforms suitable for use with the present invention include Crystal Reports™ and Brio™. However, as indicated previously herein, tabular detail reports such as that shown in FIG. 3 can be problematic in that such reports fail to provide a concise and intuitive visual representation of the contact details, and hence can be difficult for a contact manager or other user to interpret.

The illustrative embodiment of the invention overcomes these and other difficulties commonly associated with tabular detail reports. In this embodiment, a much more concise and intuitive visual representation of contact details or other call center process information is provided. Moreover, such information is generated via a reporting system which can store information in a reporting database and is compatible with existing reporting platforms, such as the above-noted Cognos ReportNet™. Advantageously, the illustrative embodiment provides a data visualization tool that allows users to obtain a better understanding of contact center processes.

FIG. 4 shows an example of a call timeline that will be used in describing the illustrative embodiment. This timeline in this example is a generic view of the process of handling a typical call in the system 100 of FIG. 1. The timeline shows certain events (e.g., queued, offered to agent, accepted, agent disconnected and completed) that occur during the processing of the call, and associated states of the call (e.g., in queue, alerting, active and wrap-up). More specifically, the sequence of events and their respective states are as follows. The call first arrives at a queue, after which the call enters the in queue state. Once an agent becomes available, the call is offered to the agent, after which the call is in the alerting state (e.g., ringing). After the call is accepted by the agent, the call enters the active state. When the agent is disconnected, the call enters the wrap-up state, and subsequent to the wrap-up the call is considered completed at the agent. It should be understood that these particular events and states, and others described herein, are presented by way of illustrative example only, and should not be construed as limiting the scope of the invention in any way.

In the illustrative embodiment, a timeline of the type shown in FIG. 4 is made more readily understandable to a call center manager or other user by utilizing different drawing objects or other image data to represent different events and states. For example, the symbols in FIG. 5A may be used to represent call processing events in the timeline, and the line styles in FIG. 5B are used to represent call states in the timeline. Referring initially to FIG. 5A, the events that are shown include queued, offered to agent, completed, accepted, contact held, disconnected, and agent disconnected. Each is represented by a corresponding distinct graphical symbol. Similarly, with reference to FIG. 5B, the states that are shown include in queue, alerting, active, on-hold and wrap-up, and each is represented by a distinct line style.

Although not illustrated as such in the figures, the different symbols and line styles used to represent respective events and states may make use of color in alternative embodiments. The symbols and line styles may be made user configurable, so that, for example, the user could change the symbol used to represent the arrival of a call, or use a different line style to indicate that a call is on hold. Also, rectangles or other shapes with different fill colors and fill patterns could be used instead of lines. Numerous alternative arrangements of symbols, line styles or other elements will be readily apparent to those skilled in the art.

FIG. 6 shows an example of a graphical display that may be generated in the system 100 of FIG. 1 utilizing timeline visualizations constructed using the symbols and line styles of respective FIGS. 5A and 5B. This display comprises a report with timeline visualizations that may be presented on display 205 of user terminal 130 in system 100. The report generally provides the same information as the tabular detail report of FIG. 3, but in a concise and intuitive visual representation. Like the FIG. 3 report, the FIG. 6 report deals with the processing of two calls, denoted by call identifiers 111 and 211, by a single agent. It includes columns for call identifier, start time, end time, routing and timeline visualization. There is a single row for each of the calls, with a graphical representation using the appropriate event symbols and state line styles to convey the call processing information. Although not shown in the figure, a time scale may be added showing more accurately when the events occurred.

A report such as that shown in FIG. 6 may be generated by, for example, a report author or other user selecting a timeline visualization feature from a list of available report items in a report authoring tool associated with reporting platform 122. Displayed fields, such as call identifier, start time, end time, routing, etc. may be similarly selected, using, by way of example, drag-and-drop from a palette of available features as in conventional report authoring tools.

From the timelines shown in the FIG. 6 example, it can be seen that the first call is queued and then quickly offered to the agent. The entry in the routing column for this call is "agent pool," which means that the call was queued and then offered to the next available agent. After alerting for a few seconds, the agent accepts the call. After a few more seconds, the agent puts the call on hold. A few seconds later, the second call rings at the agent. This is a "specific agent" call, meaning that the caller called the direct number of the agent. The agent immediately takes the first call off of hold, then disconnects a few seconds later, then accepts the second call. While active on the second call, the agent performs wrap-up on the first call, then proceeds to talk on the second call for several minutes (off the graph). From the timelines, it is clear that the agent was working on the first call, saw the second call come in (possibly a personal call), hung up on the first call, and then took the second call. The visualization in this example makes it very easy for a supervisor to identify inappropriate agent behavior at a glance.

Timelines for different entity types, e.g., agents, calls, queues and trunks, could be presented simultaneously in the same report. Also, by filtering on entity attributes, e.g., agent name, and also on other factors such as time, there are many different ways the data can be presented to the user. Any entity attributes, e.g., supervisor name, call direction (inbound or outbound), etc. available in a given reporting platform could be included in such a report.

Figure 7:
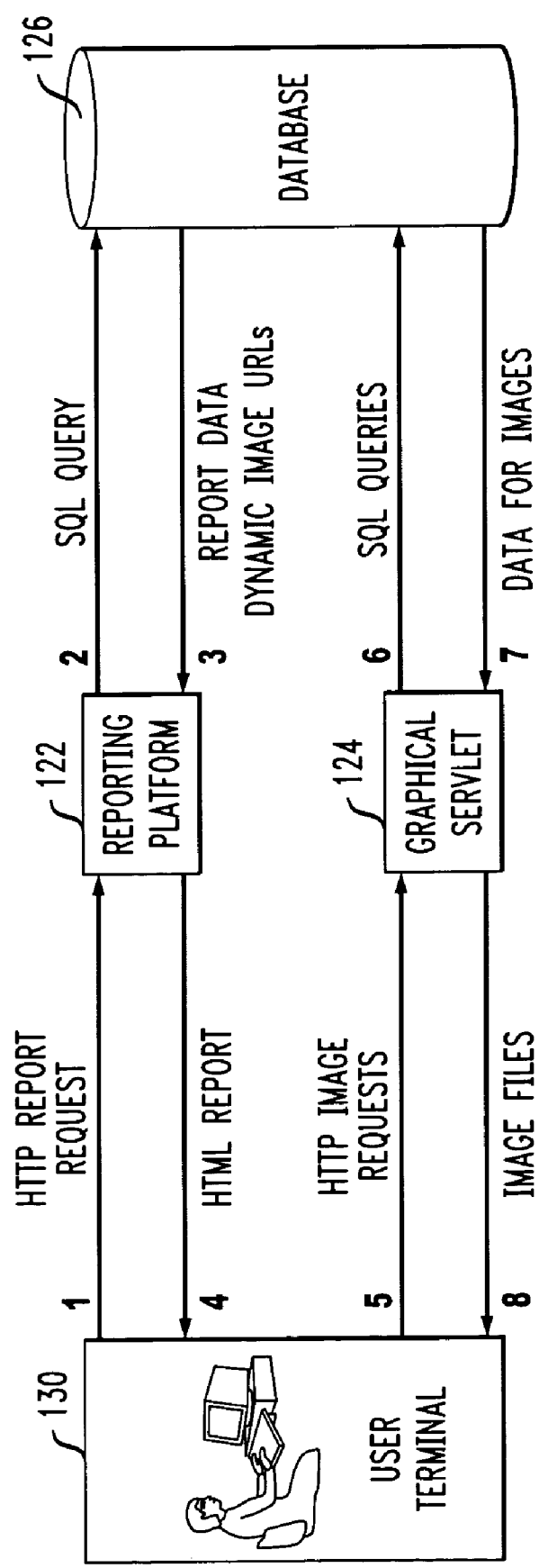
FIG. 7 is a diagram showing an exemplary processing flow associated with generating a graphical display such as that shown in FIG. 6.

FIG. 7 shows an example of the processing flow associated with generating a graphical display with timeline visualization such as that of FIG. 6. In this example, it is assumed that the reporting platform 122 comprises a conventional Cognos ReportNet™ reporting platform, and that the database 126 comprises an SQL server. Of course, other types of reporting platforms and databases may be used in alternative embodiments. The figure generally shows the interaction between user terminal 130, reporting platform 122, graphical servlet 124 and database 126 in generating a report comprising one or more timeline visualizations, and generally includes the following steps denoted steps 1 through 8:

1. A user at terminal 130 runs a report by launching a hypertext transfer protocol (HTTP) request to the reporting platform 122.

2. The reporting platform 122 generates an SQL query, then executes the query against the database 126.

3. The database 126 returns the data for the report, plus dynamically generated uniform resource locators (URLs) for the corresponding timeline images.

4. The reporting platform 122 generates a report in the form of hypertext mark-up language (HTML) pages and delivers those pages to a browser running on the user terminal 130.

5. As the browser renders the report, it encounters HTML image tags for the timeline images. For each timeline, the browser requests the image from the graphical servlet 124 using the dynamically generated URL. The URL contains any required parameters, e.g., call ID and start and end times for the timeline.

6. For each image, the graphical servlet 124 queries the database 126 to retrieve the required data, e.g., call segments.

7. The database 126 returns the data used to generate the timeline images.

8. The graphical servlet 124 returns the image files to the browser of the user terminal 130 for display in the report.

It should be noted that these particular processing steps should not be viewed as requirements of the invention, and may be replaced with different operations or otherwise varied in other embodiments.

The illustrative embodiments described above provide a number of significant advantages over conventional techniques. For example, the described techniques advantageously provide concise and intuitive graphical representations of event and state details for calls and other call center processes, in the form of timeline visualizations, and allow delivery of the timelines through otherwise conventional reporting tools. The timelines may be generated for a variety of call center entities such as agents, calls, queues, trunks, and the like. This allows simultaneous visualizations of different entity types, e.g., call and agent state, in the same report. Web-based reports involving timeline visualizations can be created dynamically and integrated with reporting platforms and third-party databases.

The improved report of FIG. 6 replaces the difficult-to-understand tabular detail report of FIG. 3, presenting the same information in a much more compact and understandable form, thereby reducing the amount of time required to understand process flows and making it easier to monitor agents and other call center entities. For example, call center managers and other users are provided with a better understanding of how agents handle calls, spend their time, deal with multiple contacts simultaneously, etc.

The techniques described herein are also applicable to other business processes, e.g., order fulfillment or any other transactional system where reports are generated detailing one or more transactions.

It should again be emphasized that the exemplary configuration of the call center shown in FIG. 1 may be altered to incorporate a wide variety of different arrangements of elements to provide the call processing functions described herein. For example, those skilled in the art will appreciated that a call center configured in accordance with the invention may be distributed over multiple geographically-dispersed physical sites. In such an arrangement, certain of the processing operations described above may be performed in a remote or centralized system while a given call or other communication is delivered to an available agent at a particular local site. The term "call center" as used herein is intended to include these and other alternative systems in which the present invention can be implemented.

It should also be noted that the invention may be implemented in the form of a computer-readable medium or other similar medium containing software which, when executed by a computer or other type of processing device, will cause the processing device to implement the processing functions described above. For example, the agent selector 114, reporting platform 122, graphical servlet 124, database 126 and other elements of system 100 may each be implemented at least in part as one or more software programs stored in a memory or any other computer readable medium associated with the system, and executed by a processor or other processing hardware associated with the system. As indicated previously, a wide variety of alternative arrangements of hardware, software and firmware may be used to provide communication processing operations in accordance with the invention.

These and numerous other alternative embodiments within the scope of the following claims will be apparent to those skilled in the art.

What is claimed is:

1. A method of generating timeline visualization information characterizing a process in a call center, utilizing a reporting system comprising a report server, a graphical server, and a database, the method comprising the steps of:

receiving a request for a report, relating to one or more specified aspects of the call center process, in the report server from a user terminal;

generating a query from the report server to the database;

utilizing information retrieved from the database responsive to the query to generate a report for delivery to the user terminal, wherein the report comprises at least one timeline having a plurality of image identifiers associated therewith; and supplying from the graphical server to the user terminal image files corresponding to respective ones of the image identifiers to thereby permit generation of a visualization of the timeline at the user terminal.

2. The method of claim 1 wherein the timeline comprises a plurality of distinct symbols representative of respective events of the call center process and a plurality of distinct line styles representative of respective states of the call center process.

3. The method of claim 2 wherein the call center process comprises the handling of one or more calls by a particular agent of the call center.

4. The method of claim 3 wherein the events of the call center process comprise one or more of a queued event, an offered to agent event, a completed event, an accepted event, a contact held event, a call disconnected event, and an agent disconnected event.

5. The method of claim 3 wherein the states of the call center process comprise one or more of an in queue state, an alerting state, an active state, an on-hold state and a wrap-up state.

6. The method of claim 1 wherein the graphical server comprises a graphical servlet.

7. The method of claim 1 wherein the report server comprises a reporting platform.

8. The method of claim 1 wherein the report server and the graphical server are implemented on a single processing device.

9. The method of claim 1 wherein the report server and the graphical server are each implemented on separate arrangements of one or more processing devices.

10. The method of claim 1 wherein the request for the report comprises an HTTP request generated in a browser of the user terminal.

11. The method of claim 1 wherein the query generated by the report server to the database comprises an SQL query.

12. The method of claim 1 wherein the image identifiers of the timeline comprise URLs supplied by the database to the report server responsive to the query.

13. The method of claim 1 wherein the graphical server supplies the image files corresponding to respective ones of the image identifiers responsive to one or more requests from a browser of the user terminal.

14. The method of claim 13 wherein for a given such request from the browser of the user terminal, the graphical server generates a query to the database, and receives in response to the query image data associated with at least one of the image files.

15. A reporting system for use in generating timeline visualization information characterizing a process in a call center, the system comprising:

a report server;

a graphical server; and a database;

the report server receiving a request for a report, relating to one or more specified aspects of the call center process, from a user terminal, generating a query to the database, and utilizing information retrieved from the database responsive to the query to generate a report for delivery to the user terminal;

wherein the report comprises at least one timeline having a plurality of image identifiers associated therewith; and wherein the graphical server supplies to the user terminal image files corresponding to respective ones of the image identifiers to thereby permit generation of a visualization of the timeline at the user terminal.

16. The system of claim 15 wherein the report server and the graphical server are implemented on a single processing device.

17. The system of claim 15 wherein the report server and the graphical server are each implemented on separate arrangements of one or more processing devices.

18. The system of claim 15 wherein the report server, the graphical server and the database are implemented using one or more processing devices each comprising a processor coupled to a memory.

19. The system of claim 15 wherein the timeline comprises a plurality of distinct symbols representative of respective events of the call center process and a plurality of distinct line styles representative of respective states of the call center process.

20. An article of manufacture comprising a machine-readable storage medium containing one or more software programs for generating timeline visualization information characterizing a process in a call center, utilizing a reporting system comprising a report server, a graphical server, and a database, wherein the one or more software programs, when executed in one or more processing devices, cause the system to perform the steps of:

receiving a request for a report, relating to one or more specified aspects of the call center process, in the report server from a user terminal;

generating a query from the report server to the database;

utilizing information retrieved from the database responsive to the query to generate a report for delivery to the user terminal, wherein the report comprises at least one timeline having a plurality of image identifiers associated therewith; and supplying from the graphical server to the user terminal image files corresponding to respective ones of the image identifiers to thereby permit generation of a visualization of the timeline at the user terminal.

* * * * *